United States Patent
Omichi et al.

(10) Patent No.: US 10,950,893 B2
(45) Date of Patent: Mar. 16, 2021

(54) LIQUID ELECTROLYTE FOR BATTERY

(71) Applicant: HONDA MOTOR CO., LTD., Tokyo (JP)

(72) Inventors: Kaoru Omichi, Raymond, OH (US); Christopher Brooks, Dublin, OH (US); Ryan McKenney, Upper Arlington, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 753 days.

(21) Appl. No.: 15/421,136

(22) Filed: Jan. 31, 2017

(65) Prior Publication Data

US 2018/0175448 A1 Jun. 21, 2018

Related U.S. Application Data

(60) Provisional application No. 62/436,302, filed on Dec. 19, 2016.

(51) Int. Cl.
| | |
|---|---|
| *C07D 323/00* | (2006.01) |
| *H01M 10/0567* | (2010.01) |
| *H01M 10/0569* | (2010.01) |
| *H01M 10/0568* | (2010.01) |
| *H01M 10/05* | (2010.01) |

(52) U.S. Cl.
CPC ....... *H01M 10/0567* (2013.01); *H01M 10/05* (2013.01); *H01M 10/0568* (2013.01); *H01M 10/0569* (2013.01); *H01M 2300/0025* (2013.01)

(58) Field of Classification Search
CPC .................................................. C07D 323/00
See application file for complete search history.

(56) References Cited

U.S. PATENT DOCUMENTS

| | | | |
|---|---|---|---|
| 4,052,539 | A | 10/1977 | Shropshire et al. |
| 4,609,600 | A | 9/1986 | Heinze et al. |
| 5,130,211 | A | 7/1992 | Wilkinson et al. |
| 5,491,041 | A | 2/1996 | Abraham et al. |
| 6,306,540 | B1 | 10/2001 | Hiroi et al. |
| 6,489,055 | B1 | 12/2002 | Ichihashi et al. |
| 6,852,446 | B2 | 2/2005 | Barbarich |
| 7,078,124 | B2 | 7/2006 | Kim et al. |
| 8,101,302 | B2 | 1/2012 | Lamanna et al. |
| 9,130,231 | B2 | 9/2015 | Halalay et al. |
| 9,178,254 | B2 | 11/2015 | Lee et al. |
| 2008/0131785 | A1 | 6/2008 | Park et al. |
| 2008/0171268 | A1 | 7/2008 | Yazami |
| 2009/0130502 | A1 | 5/2009 | Liu et al. |
| 2010/0021815 | A1 | 1/2010 | Oh et al. |
| 2014/0030559 | A1 | 1/2014 | Yazami et al. |
| 2014/0057156 | A1 | 2/2014 | Hasenkox |

FOREIGN PATENT DOCUMENTS

| | | |
|---|---|---|
| JP | 2000-195548 A | 7/2000 |
| JP | 2002-151146 A | 5/2002 |
| JP | 2012-069576 A | 4/2012 |
| WO | WO 2012/087414 A2 | 6/2012 |

OTHER PUBLICATIONS

Jadhav, V., et al. "Crown ether metal complex fluoride salt as a facile and low hygroscopic fluoride source for nucleophilic fluorination." Chemical Engineering Journal. (2015), vol. 270, pp. 36-40. (Year: 2015).*

Gores, H.J., et al. "Non-Aqueous Electrolyte Solutions." (2014). In: Kreysa G., Ota K., Savinell R.F. (eds). Encyclopedia of Applied Electrochemistry. Springer, New York, NY. (Year: 2014).*

"How Batteries Work: Rechargeable Batteries." (Jun. 11, 2011). Accessed Apr. 30, 2020. Available from: < https://electronics.howstuffworks.com/everyday-tech/battery5.htm >. (Year: 2011).*

Bajaj et al. "Comprehensive Coordination Chemistry of Alkali and Alkaline Earth Cations with Macrocyclic Multidentaties: Lastest Position", Coordination Chemistry Reviews, pp. 55-186, 1988.

Ignatova, et al., "Influence of 15-Crown-5 Additive to Liquid Electroyte on the Performance Li/CFx—Systems at Temperatures up to −50C"/ Journal of Power Sources, vol. 309, pp. 116-121, 2016.

Izatt et al., Thermodynamic and Kinetic Data for Cation-Macrocycle Interation, Chemical Reviews, vol. 85, pp. 271-339, 1985.

Jadhav et al. "Crown Ether Metal Complex Fluoride Salt as a Facile and Low Hygroscopic Flouirde Source for Nucleophilic Fluorination", Chemical Engineering Journal, vol. 270, pp. 36-40. 2015.

Lamb et al., "Chemically Supressed Anion Chromatography Based on Macrocycle-Cation Complexation", Journal of Chromatography, vol. 482, pp. 367-380, 1989.

Oxtoby, et al., "Electrochemistry", Principles of Modern Chemistry, Saunders College Publishing, pp. 401-443, 1999.

Extended European Search Report for related European Application No. 17208234.9 dated Mar. 2, 2018.

* cited by examiner

*Primary Examiner* — John S Kenyon
(74) *Attorney, Agent, or Firm* — Arent Fox LLP

(57) ABSTRACT

The present disclosure relates to an electrochemical cell which may be used, for example, in a rechargeable battery based on the reversible transfer of halide anions, and a method for making an electrolyte composition for use in the same. The electrochemical cell includes a positive electrode, a negative electrode, and an electrolyte composition positioned between the two electrodes, where the electrolyte composition contains a crown ether-metal halide complex in a solvent.

9 Claims, 4 Drawing Sheets

LIQUID ELECTROLYTE FOR BATTERY

BACKGROUND

In recent years, lithium ion batteries have become widely used for a range of electronics applications, including portable electronic devices, and in a variety of fields, including information technology, communications, biomedical engineering, sensing, military, and lighting. Although lithium has several beneficial properties, lithium ion batteries also suffer from several disadvantages.

Researchers have begun to explore alternatives, including fluoride shuttle batteries. Fluoride ions generated at the anode can travel through the electrolyte to the cathode, and this process can be made reversible, for a rechargeable battery. Such fluoride shuttle batteries may have higher energy density than lithium ion batteries.

However, fluoride shuttle systems described to date are limited in scope. For example, only a narrow scope of solvents has been available for use in the electrolyte, because of the need to solubilize the fluoride salt. In addition, these batteries require a relatively high minimum concentration of the fluoride salt. Accordingly there is a need for a fluoride shuttle battery that can operate using a lower salt concentration and with a wider range of solvents.

SUMMARY

In some embodiments, the present disclosure is directed to a method of making an electrolyte composition, the method comprising dissolving a crown ether and a metal halide in a solvent; reacting the crown ether and the metal halide to form a crown ether-metal halide complex; isolating the crown ether-metal halide complex; and adding the crown ether-metal halide complex into an electrolyte so as to generate halide ions in the electrolyte.

In other embodiments, the present disclosure is directed to an electrochemical cell comprising an anode; a cathode; and an electrolyte composition, wherein the electrolyte composition comprises a solvent and a crown ether-metal halide complex present in a concentration of about 0.01 M to about 1 M, wherein the crown ether-metal halide complex is at least partially present in a dissolved state in the electrolyte composition, such that halide ions are present in the electrolyte composition.

In other embodiments, the present disclosure is directed to an electrochemical cell comprising an anode; a cathode; and an electrolyte composition, wherein the electrolyte composition comprises a non-aqueous solvent and a crown ether-metal fluoride complex including one or more fluoride ions, wherein the crown ether-metal fluoride complex is at least partially dissolved and the concentration of the fluoride ions dissolved in the electrolyte composition is about 0.01 M to about 1 M.

DETAILED DESCRIPTION

Figure 1:
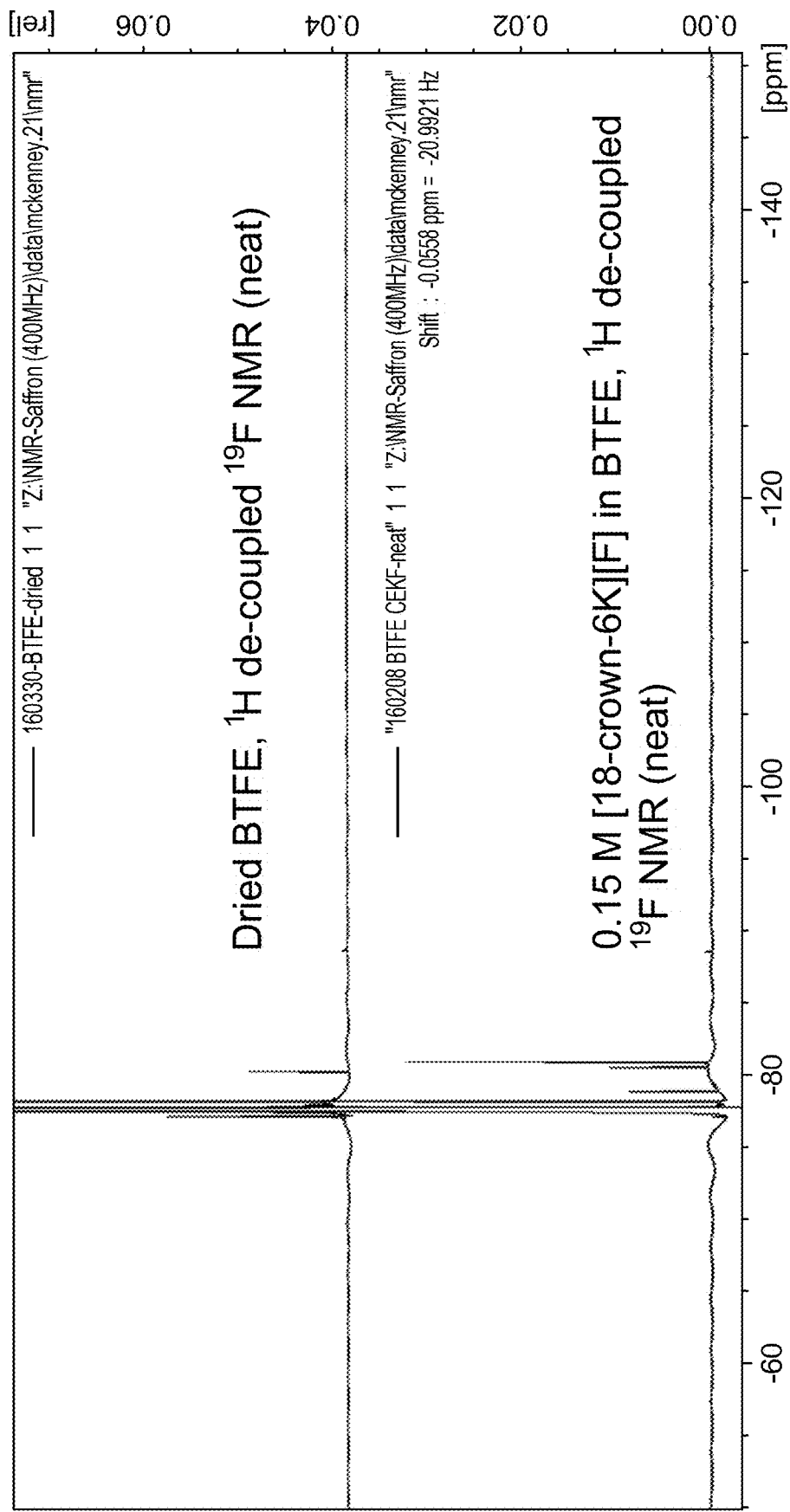
FIG. 1 shows $^{19}F$ NMR spectra of an electrolyte according to the present disclosure, before and after addition of a crown ether-metal halide complex.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries, and electrolysis systems. General cell and/or battery construction is known in the art (see, e.g., Oxtoby et al., Principles of Modern Chemistry (1999), pp. 401-443).

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present disclosure may be provided in a range of useful configurations and form factors as known in the art of electrochemistry and battery science, including thin electrode designs, such as thin film electrode configurations. Electrodes are manufactured as known in the art, including as disclosed in, for example, U.S. Pat. No. 4,052,539, and Oxtoby et al., Principles of Modern Chemistry (1999), pp. 401-443.

"Electrolyte" refers to an ionic conductor which can be in the solid state, the liquid state (most common), or more rarely a gas (e.g., plasma). The electrolyte is preferably present in the liquid state.

"Cation" refers to a positively charged ion, and "anion" refers to a negatively charged ion.

In some embodiments, the present disclosure is directed to a method of making an electrolyte composition, the method comprising dissolving a crown ether and a metal halide in a solvent; reacting the crown ether and the metal halide to form a crown ether-metal halide complex; isolating the crown ether-metal halide complex; and adding the crown ether-metal halide complex into an electrolyte so as to generate halide ions in the electrolyte.

In other embodiments, the present disclosure is directed to an electrochemical cell comprising an anode; a cathode; and an electrolyte composition, wherein the electrolyte composition comprises a solvent and a crown ether-metal halide complex present in a concentration of about 0.01 M to about 1 M, wherein the crown ether-metal halide complex is at least partially present in a dissolved state in the electrolyte composition, such that halide ions are present in the electrolyte composition. All aspects described apply with equal force to the method and to the apparatus.

As used herein, a "metal halide" is a salt comprising at least one metal ion and at least one halide ion. As used herein, a "crown ether" is a cyclic ether containing at least carbon and oxygen atoms, with two or more carbon atoms between oxygen atoms. Without wishing to be bound by any theory, in a crown ether-metal halide complex, the metal ion is at least partially ligated by a crown ether. Accordingly, the metal ions may be at least partially dissociated from the halide ions. In a preferred aspect of the present disclosure, the crown ether-metal halide complex is at least partially present in a dissolved state in the electrolyte, and the halide ions are at least partially dissociated from the metal ions, which are at least partially ligated by crown ethers. Without wishing to be bound by any theory, complexation of a metal halide to a crown ether may increase the solubility of the metal halide, the component metal ions, and/or the component halide ions in a given solvent, especially an organic solvent.

Crown ethers are macrocyclic polyether compounds that are capable of selectively forming complexes with a variety of different cationic species. Izatt et al., Chem. Rev. 85:271 (1985), Bajaj et al., Coord. Chem. Rev. 87:55 (1988) and Lamb et al., Journal of Chromatography 482:367-380 (1989). These compounds are referred to as "crowns" because their chemical structures resemble the shape of the regal crown and because of their ability to "crown" cationic species by complexation. The crown ethers may include one or more substituents which are aromatic, such as benzo- or dibenzo-crown ethers, heteroaromatic, particularly derivatives of pyridine, heterocyclic non-aromatic cyclic rings containing oxygen, sulfur or nitrogen, such as tetrahydrofuran, piperidine and pyrrolidine, alicyclic substituents, saturated carbon rings such as cyclopentane and cyclohexane, aliphatic substituents, and the like. In some aspects, the crown ether comprises one or more of 18-crown-6, dibenzo-18-crown-6, 15-crown-5, 12-crown-4, 4,13-diaza-18-crown-6, 1,7-diaza-12-crown-4, dicyclohexano-18-crown-6, 1-aza-18-crown-6, 4',4"(5")-di-tertbutyldicyclohexano-18-crown-6, 2-hydroxymethyl-18-crown-6, 2-hydroxymethyl-12-crown-4, 2,3-naphtho-15-crown-5, 2-hydroxymethyl-15-crown-5, 4'-amino-5'-nitrobenzo-15-crown-5, 4-tert-butylcyclohexano-15-crown-5, 1-aza-15-crown-5, 4'-aminobenzo-15-crown-5, 2-aminomethyl-18-crown-6, 1-aza-12-crown-4, 4'-aminobenzo-18-crown-6, dibenzo-24-crown-8, 2-aminomethyl-15-crown-5, 4'-aminodibenzo-18-crown-6, benzo-15-crown-5, benzo-18-crown-6, 4'-carboxybenzo-15-crown-5, dibenzo-30-crown-10, dibenzo-21-crown-7, dibenzo-15-crown-5, 4'-formylbenzo-15-crown-5, 4'-nitrobenzo-15-crown-5, 1,10-diaza-18-crown-6, 1,10-Dibenzyl-1,10-diaza-18-crown-6, and dinitrodibenzo-18-crown-6. Preferably, the crown ether is 18-crown-6. Selected, non-limiting examples of crown ethers are shown below:

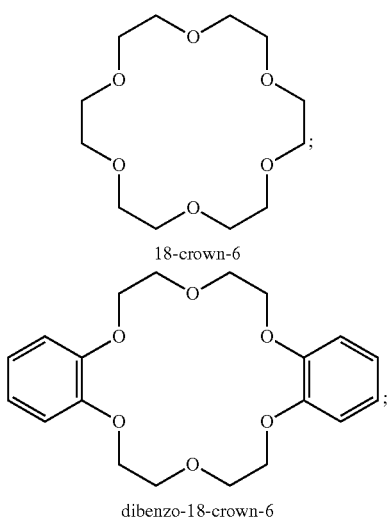

18-crown-6 dibenzo-18-crown-6

-continued

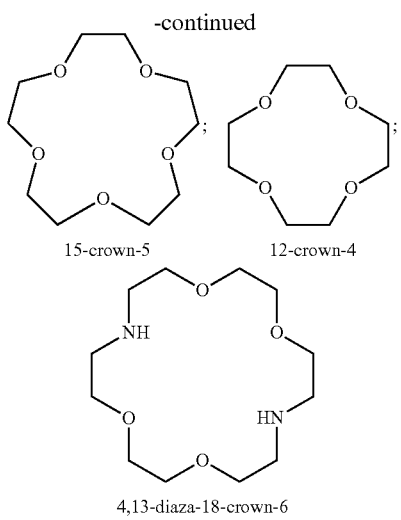

15-crown-5

12-crown-4

4,13-diaza-18-crown-6

In some aspects, the metal halide comprises a metal ion selected from the group consisting of potassium, sodium, lithium, magnesium, and calcium ions.

In some aspects, the metal halide comprises a halide ion selected from the group consisting of fluoride, chloride, and bromide ions. Preferably, the metal halide is a metal fluoride. More preferably, the metal halide is potassium fluoride.

In some aspects, the crown ether complex is the reaction product of a potassium halide and an 18-crown-6 ether, a dibenzo-18-crown-6 ether, or a 15-crown-5 ether. In a non-limiting example, the potassium halide is potassium bromide, potassium chloride, or potassium fluoride. In some aspects, the crown ether complex is the reaction product of a sodium halide and a 15-crown-5 ether. In a non-limiting example, the sodium halide is sodium bromide, sodium chloride, or sodium fluoride. In some aspects, the crown ether complex is the reaction product of a lithium halide and a 12-crown-4 ether. In a non-limiting example, the lithium halide is lithium fluoride. In some aspects, the crown ether complex is the reaction product of a magnesium halide, such as magnesium fluoride, and a 4,13-diaza-18-crown-6 ether. In some aspects, the crown ether complex is the reaction product of a calcium halide and a 4,13-diaza-18-crown-6 ether or a 18-crown-6 ether. In a non-limiting example, the calcium halide is calcium bromide, calcium chloride, or calcium fluoride.

In some aspects, the crown ether complex is the reaction product of 18-crown-6 ether and a metal fluoride characterized by the formula:

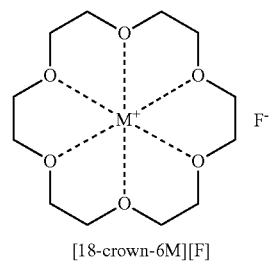

[18-crown-6M][F]

wherein M is Na, K, or Ca.

In some aspects, the electrolyte is a nonaqueous electrolyte that comprises one or more organic solvents. As used herein, an "organic solvent" is defined as a carbon-containing solvent.

In some aspects, the organic solvent is selected from the group consisting of propanenitrile (PN), 2,6-difluoropyridine (2,6-DFP), 2-fluorobenzonitrile (2-FBN), N-methyl-N-propylpiperidnium bis((trifluoromethyl)sulfonyl)amide (MPPyTFSI), and bis(trifluoroethyl)ether (BTFE).

In some aspects, the crown ether-metal halide complex comprises 18-crown-6-potassium fluoride complex ([18-crown-6K][F]), 12-crown-4(lithium fluoride), or 15-crown-5(sodium fluoride). In some aspects, the crown-ether metal halide complex comprises a complex of a metal bromide or a metal chloride with a crown ether which comprises 18-crown-6, 12-crown-4, or 15-crown-5. In some aspects, the electrolyte comprises one or more solvents, and one or more crown ether-metal halide complexes.

In some aspects, one or more crown ether-metal halide complex is added to the electrolyte up to a concentration of about 0.01 M to about 1 M. In some aspects, the crown ether-metal halide complex is added to the electrolyte up to a concentration of about 0.01 M to about 0.5 M. In some aspects, the crown ether-metal halide complex is added to the electrolyte in a concentration of greater than 0.08M, optionally from 0.08M to 0.20M, optionally greater than 0.10 M, optionally greater than 0.115 M, optionally from 0.115 M to 0.20 M, and optionally from 0.115 M to 0.18 M.

The crown ether and the metal halide may be reacted to form a crown ether-metal halide complex by any suitable procedure known in the art. For example, the complex may be formed by the methods described in Jadhav et al., Chemical Engineering Journal (2015) 270:36-40, which is herein incorporated by reference in its entirety. The reaction may be carried out in any solvent in which both the crown ether and the metal halide are soluble, including but not limited to water. The reaction may be carried out at any temperature, for any length of time, and under any other conditions needed to form the complex; complex formation may be verified by analytical and/or spectroscopic methods known to those of skill in the art, including NMR spectroscopy. The crown ether-metal halide complex may be isolated by any suitable procedure known in the art.

According to some aspects, one or more of the steps of the method according to the present disclosure may be performed at room temperature. As used herein, the term "room temperature" refers to the ambient temperature of the room wherein the reaction is performed. According to some aspects, room temperature may be a temperature from about 21 to about 27° C., such as about 23° C.

Organic solvents suitable for use in electrolytes and electrolyte compositions of the present disclosure include those recited above and those known to persons of ordinary skill in the art. Suitable organic solvents include those in which the crown ether-metal halide complex is soluble and has ion mobility. As used herein, the "ion mobility" or "ionic conductivity" in a solvent or electrolyte is a measure of the movement or conduction of ions in the solvent or electrolyte. Table 1 shows solubility and ion mobility data for 18-crown-6-potassium fluoride complex ([18-crown-6K][F]) in various solvents.

In some aspects, the anode and cathode may each, independently of the other, comprise a metal, a metal fluoride, or graphite. In some aspects, the anode and cathode may each, independently of the other, comprise metal or metal fluoride where the metal comprises lithium, sodium, potassium, rubidium, cesium, beryllium, calcium, strontium, barium, scandium, yttrium, lanthanum, or cerium.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Example 1—18-Crown-6 Potassium Fluoride Complex Synthesis and Detection of Free Fluoride Ion A solution of potassium fluoride (1.16 g, 20 mmol, 1 equiv) and 18-crown-6 (5.28 g, 20 mmol, 1 equiv) was stirred in de-ionized water (30 mL) for 24 h at 23° C. The water was removed under reduced pressure, yielding a white solid, and was further dried under vacuum until no water remained. This generated 6.38 g (19.8 mmol, 99%) of the 18-crown-6 potassium fluoride complex [18-crown-6K][F]. Spectroscopic data corresponded with that in the literature. $^1$H NMR (400 MHz, CDCl$_3$) 3.70 (s, 24H).

FIG. 1 (bottom) shows the $^1$H decoupled $^{19}$F NMR spectrum (400 MHz) of [18-crown-6K][F] in BTFE, where the complex is present at a concentration of 0.15 M. For comparison purposes, FIG. 1 (top) shows the $^1$H decoupled $^{19}$F NMR spectrum (400 MHz) of dried BTFE (neat). Relative to the reference spectrum of neat BTFE, the spectrum of [18-crown-6K][F] shows a new peak at δ −81 ppm, corresponding to free fluoride ion.

Example 2—Solubility of 18-Crown-6 Potassium Fluoride Complex in Various Organic Solvents The 18-crown-6 potassium fluoride complex [18-crown-6K][F] prepared in Example 1 was dissolved in various organic solvents. The solubility of the 18-crown-6 potassium fluoride complex in each solvent is shown in Table 1.

TABLE 1

Solubility and Ion Mobility of [18-Crown-6K][F] in Various Organic Solvents

| Solvent | 0.1M [18-Crown-6-K][F] | Solvent weight (g) | Fluoride Ion Solubility (M) | [18-crown-6-K][F] Ion mobility (uS/cm) |
|---|---|---|---|---|
| PN | 0.192 | 3.505 | 0.131 | 38.7 |
| 2,6-DFP | 0.161 | 7.894 | 0.080 | 17.31 |
| 2-FBN | 0.190 | 3.74 | 0.176 | 97.6 |
| MPPyTFSI | 0.194 | 7.341 | 0.115 | 4700 |
| BTFE | 0.178 | 5.218 | 0.149 | 270 |

Example 3—Electrochemical Test of a Pb Plate Fluorination Reaction

Figure 2:
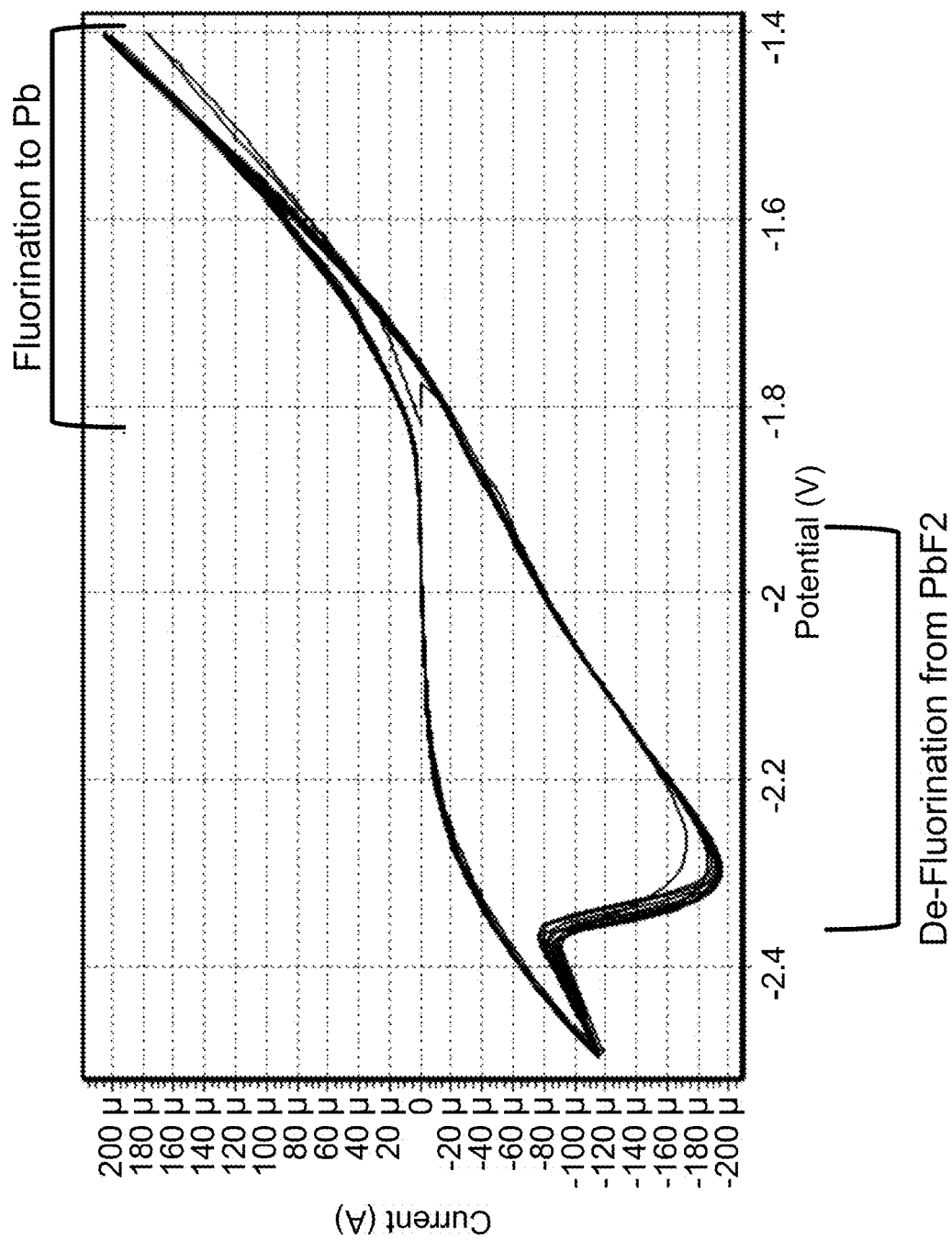
FIG. 2 shows the results of an electrochemical test of a Pb plate fluorination reaction with an electrolyte according to the present disclosure.

FIG. 2 shows the cyclic voltammogram from the reaction. A PbF$_2$ structure was evolved at about −1.4 V. De-fluorination from PbF$_2$ was observed at about −2.3 V.

Figure 3:
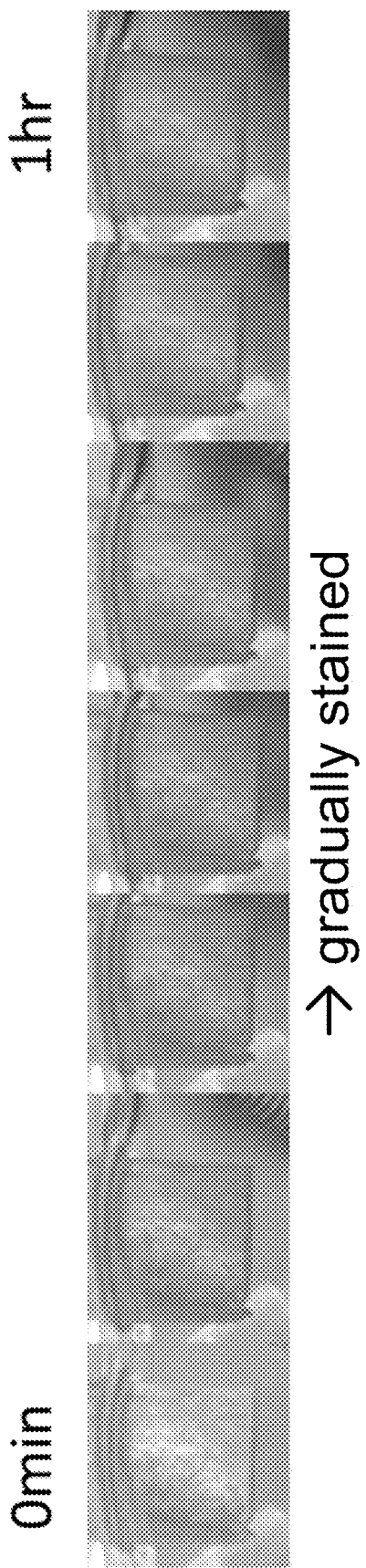
FIG. 3 shows images of the Pb plate over the course of 1 hour of fluorination reaction.

FIG. 3 shows the Pb plate over the course of reaction. A gradual staining of the plate is observed over 1 hour, indicating the formation of PbF$_2$.

Figure 4:
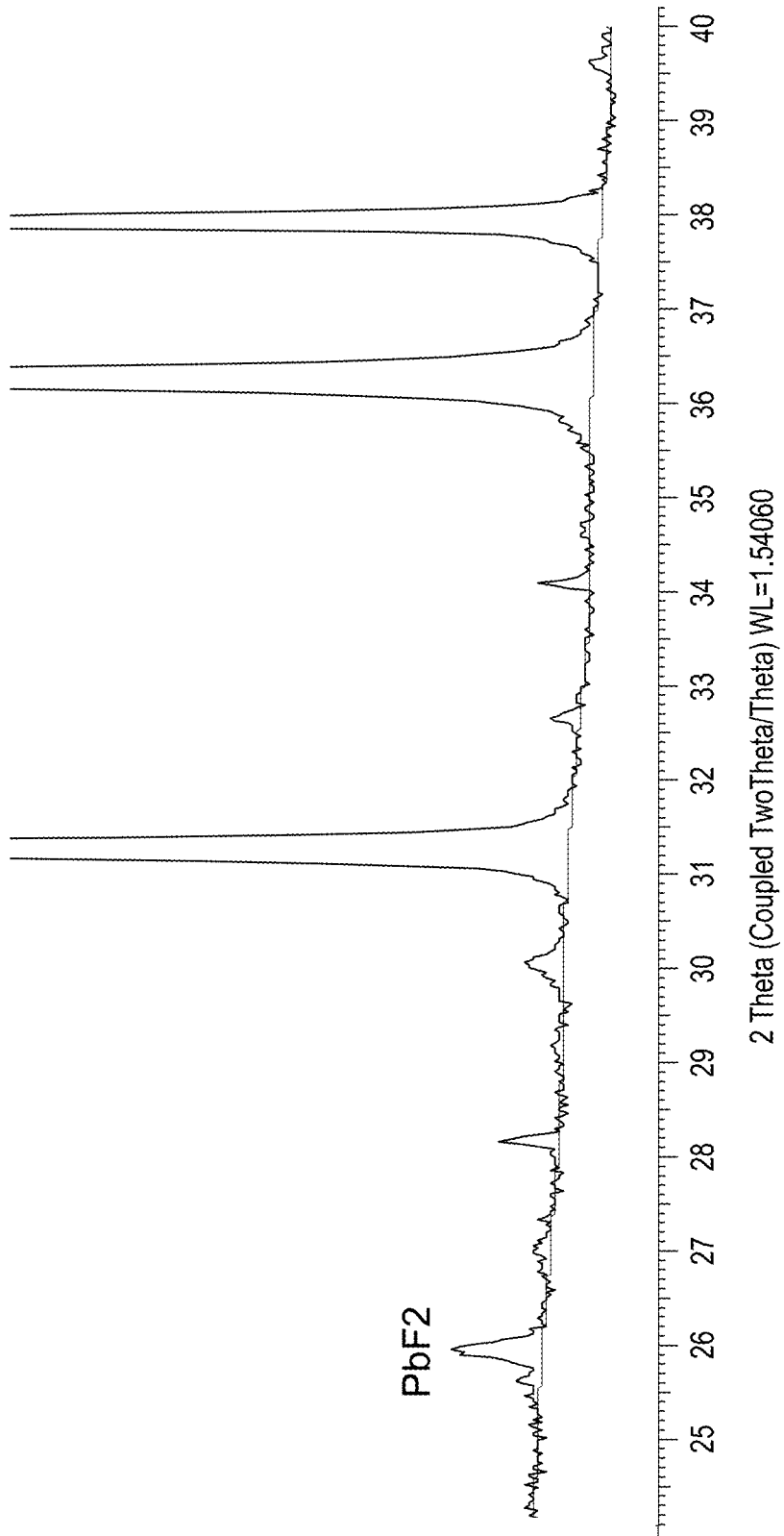
FIG. 4 shows an XRD spectrum of the fluorination reaction after 1 hour.

FIG. 4 shows the XRD spectrum after 1 hour of the fluorination reaction. The peak at about 26°2θ corresponds to PbF$_2$.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A method of making an electrolyte composition, the method comprising:
    (a) dissolving a crown ether and a metal halide in a solvent;
    (b) reacting the crown ether and the metal halide to form a crown ether-metal halide complex;
    (c) isolating the crown ether-metal halide complex; and
    (d) adding the crown ether-metal halide complex into a non-aqueous electrolyte solution of a rechargeable battery to provide one or more halide ions in the electrolyte solution, wherein the electrolyte solution comprises at least one organic solvent.

2. The method of claim 1, wherein the metal halide comprises a metal ion selected from the group consisting of potassium, sodium, lithium, magnesium, and calcium ions.

3. The method of claim 1, wherein the metal halide is a metal fluoride.

4. The method of claim 1, wherein the metal halide is potassium fluoride.

5. The method of claim 4, wherein the crown ether is selected from the group consisting of 18-crown-6, dibenzo-18-crown-6, and 15-crown-5.

6. The method of claim 5, wherein the crown ether is 18-crown-6.

7. The method of claim 1, wherein the crown ether is 18-crown-6, the metal halide is potassium fluoride, the crown ether-metal halide complex is 18-crown-6 potassium fluoride complex, and the concentration of the fluoride ions dissolved in the electrolyte solution is from 0.08 to 0.20M.

8. The method of claim 1, wherein the organic solvent is selected from the group consisting of propanenitrile, 2,6-difluoropyridine, 2-fluorobenzonitrile, N-methyl-N-propylpiperidnium bis((trifluoromethyl)sulfonyl)amide, and bis(trifluoroethyl)ether.

9. The method of claim 1, wherein the concentration of said halide ions dissolved in the electrolyte solution is from 0.01 M to 1 M.

* * * * *